United States Patent [19]

Beagle et al.

[11] Patent Number: 5,058,623

[45] Date of Patent: Oct. 22, 1991

[54] VALVE ASSEMBLY

[75] Inventors: Gerald R. Beagle, Blissfield; Christopher L. Schultz, Onsted, both of Mich.

[73] Assignee: Blissfield Manufacturing Company, Blissfield, Mich.

[21] Appl. No.: 585,296

[22] Filed: Sep. 19, 1990

[51] Int. Cl.⁵ .................................................. F16K 15/02
[52] U.S. Cl. ..................................................... 137/540
[58] Field of Search .......................................... 137/540

[56] References Cited

U.S. PATENT DOCUMENTS

| | | |
|---|---|---|
| Re. 23,144 | 9/1949 | Andersen . |
| 1,094,543 | 4/1914 | Donnelly . |
| 1,405,525 | 2/1922 | Le Cain . |
| 1,690,501 | 11/1928 | Potts . |
| 1,705,293 | 3/1929 | Horthy ................... 137/540 X |
| 1,776,726 | 9/1930 | Gross . |
| 1,879,020 | 9/1932 | Balsiger .................. 137/540 X |
| 2,007,590 | 7/1935 | Baillio . |
| 2,331,378 | 10/1943 | Dykeman . |
| 3,456,686 | 7/1969 | Kemble .................. 137/540 X |
| 3,966,119 | 6/1976 | Harter et al. . |
| 4,209,062 | 6/1980 | Woodhull, Jr. . |
| 4,308,652 | 1/1982 | Woodhull, Jr. . |

FOREIGN PATENT DOCUMENTS

| | | | |
|---|---|---|---|
| 156783 | 9/1983 | Japan .......................... 137/540 |
| 848842 | 7/1981 | U.S.S.R. ..................... 137/540 |

*Primary Examiner*—Robert G. Nilson
*Attorney, Agent, or Firm*—Emch, Schaffer, Schaub & Porcello Co.

[57] ABSTRACT

A valve assembly is disclosed. The valve assembly includes a valve body having inlet and outlet openings. A central cavity is defined by the valve body. A movable poppet is positioned within the cavity. A plug closes the cavity and a spring extends between the rear end of the poppet and the plug. The rear end of the poppet defines a cylindrical recess and the valve body defines a drain opening adjacent the outlet. The cylindrical recess provides a fluid passage to the drain opening. The poppet is opened when the fluid pressure on the inlet side overcomes the force of the spring and is closed when the force of the spring is greater than the fluid pressure force on the front of the poppet.

5 Claims, 3 Drawing Sheets

VALVE ASSEMBLY

BACKGROUND OF THE INVENTION

The present invention is directed to a valve assembly and more particularly to a valve assembly which is opened by fluid pressure. Such valve assemblies are utilized, for example, as by-pass valve assemblies. U.S. Pat. No. 4,209,062 discloses a heat exchanger construction using a prior art by-pass valve assembly.

Often, a prior art valve assembly could be tampered with in the field. Such tampering could result in adjustment of spring forces or the changing of component positions, which would change the valve assembly from its initial design conditions.

It is an object of the present invention to provide an improved by-pass valve assembly which is tamperproof.

It is a further object of the present invention to provide an improved by-pass valve assembly having minimal parts which are movable within the valve assembly.

Further objects of the invention will be apparent from the following specification and claims.

SUMMARY OF THE INVENTION

The present invention is directed to a valve assembly, which is particularly adaptable for use as a by-pass valve assembly. A valve body has an inlet opening and a discharge opening. A fluid passageway extends between the openings. The valve body defines a central cavity which is in fluid communication with the inlet opening and the discharge opening.

A poppet is slideably mounted within the central cavity and permits free flow in one direction when opened. The valve assembly is movable between an open position where fluid may pass through the valve and a closed position where fluid is essentially prevented from passing through the valve. A spring urges the poppet toward the closed position. A closure, such as a fixed plug, is provided for closing the central cavity. A drain opening is defined by the valve body for draining fluid from the central cavity.

When the fluid pressure at the inlet opening exceeds the force of the spring, the poppet is moved toward the open position and fluid may move along the fluid passageway between the inlet and discharge openings. A cylindrical recess is provided on the exterior of the rear end of the poppet and provides a passage to the drain opening which allows fluid to pass from the rear side of the poppet when the poppet is either in its open position or its closed position.

DESCRIPTION OF THE PREFERRED EMBODIMENTS

Figure 1:
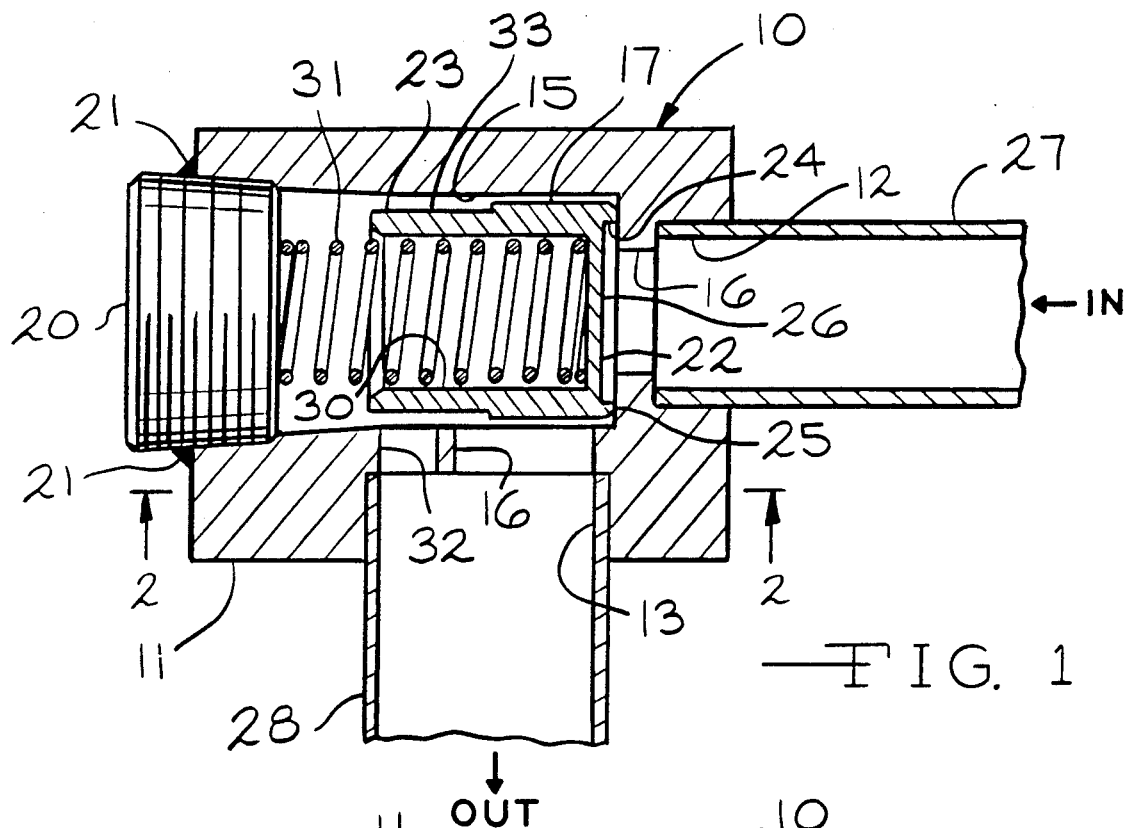
FIG. 1 is a cross-sectional view of a valve assembly, according to the present invention.
Figure 2:
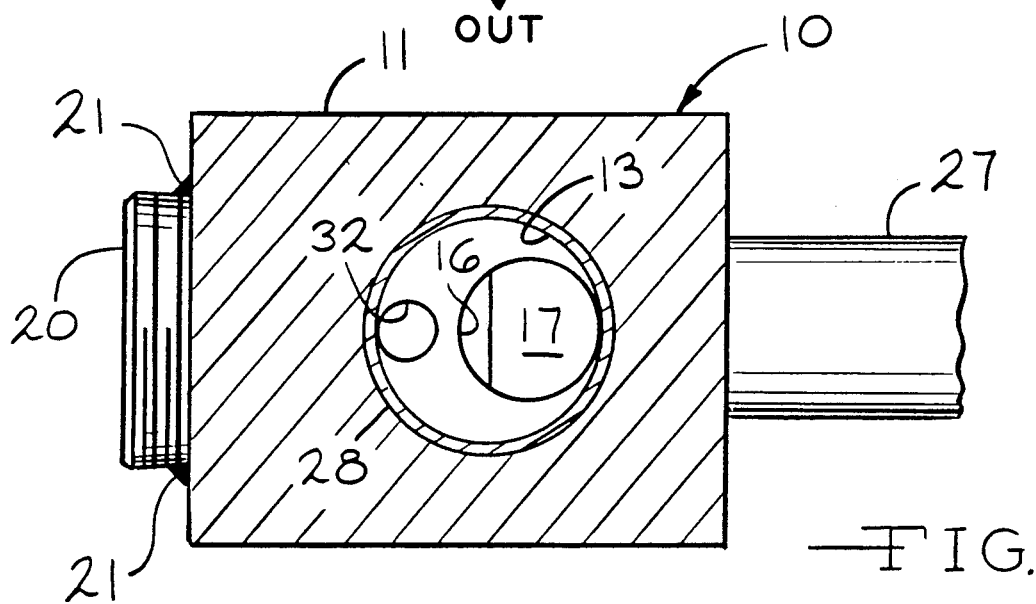
FIG. 2 is a cross-sectional view taken along the line 2—2 of FIG. 1.
Figure 3:
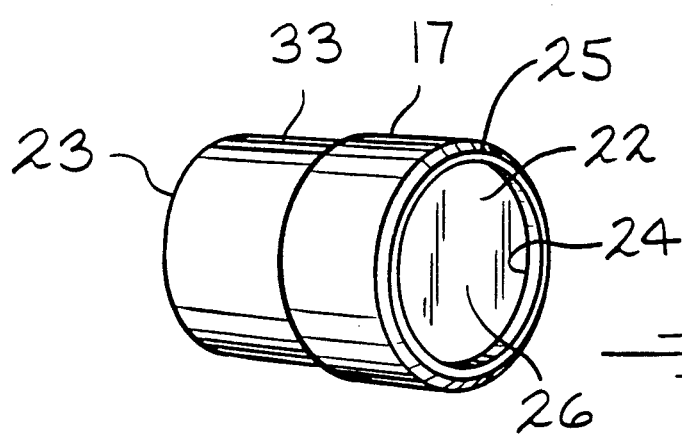
FIG. 3 is a perspective view of the poppet.

A valve assembly, according to the present invention, is generally indicated in FIGS. 1 and 2 by the reference number 10. The valve assembly 10 includes a valve body 11 having an inlet opening 12 and a discharge opening 13. The valve body 11 defines a central cavity 15. A fluid passageway 16 exceeds between the inlet opening 12 and the discharge opening 13. The central cavity 15 is in communication with the inlet opening 12 and the discharge opening 13 and serves as a portion of the overall fluid passageway 16. A shuttle or poppet 17 is slideably mounted within the central cavity 15. The poppet 17 is movable between an open position wherein fluid or liquid may pass through the inlet opening 12 and out the discharge opening 13 and a closed position wherein fluid or liquid is essentially prevented from passing through the liquid passageway 16 to the discharge opening 13. Because there normally is metal-to-metal contact between the poppet 17 and the valve body 11, there is some amount of fluid leakage to the discharge opening 13 even when the valve assembly 10 is in its closed position, as shown in FIG. 1.

A closure such as a threaded plug 20 is fixed to the valve body 11 and closes the central cavity 15. The threaded plug 20 is attached to the valve body 11 by welds 21. The poppet 17 has a front end 22 and a rear end 23. The poppet defines a recess 24 on the front end 22. The recess 24 is surrounded by a sealing ring 25. The recess 24 of the poppet 17 has a diameter greater than the diameter of the liquid passageway 16 adjacent the inlet opening 12. The poppet 17 defines a pressure surface 26 defined by the sealing ring 25.

An inlet conduit 27 is connected to the inlet opening 12 of the valve body 11. Similarly, an outlet conduit 28 is connected to the discharge opening 13 of the valve body 11. Fluid, such as oil, enters through the inlet conduit 27 and engages the pressure surface 26 of the poppet 17.

The rear end 23 of the poppet 17 defines a spring opening 30. A compression spring 31 extends between the plug 20 and the poppet 17. The compression spring 31 is received in the spring opening 30 of the poppet 17. The spring opening 30 is of such a depth as to prevent total spring compression when the valve assembly is fully open. A drain opening 32 is defined by the valve body 11 and extends between the central cavity 15 of the valve body 11 and the discharge opening 13. The rear end of the poppet 17 defines an exterior cylindrical recess 33. The cylindrical recess 33 provides a fluid passage leading from the rear of the central cavity 15 when the poppet 17 is either in its open position or in its closed position. The drain opening 32 and the passageway prevent a buildup of fluid and pressure behind the poppet 17 which would prevent the poppet 17 from moving rearwardly to its open position.

While the components of the present invention may be made of different materials, the valve body 11 in the present embodiment is steel, such as a relatively high lead steel. The poppet 17 is constructed of case hardened steel, such as a 12L14 steel. The poppet 17 is essentially the only moving part in the valve assembly 10. During operation, fluid such as oil enters the inlet conduit 27. If the valve assembly 10 is being used in a by-pass valve assembly, for a heat exchanger, it is not unusual for the cold startup pressure in, for example, an off-the-road vehicle, to reach 500 psi. The force of the spring 31 is designed to provide a cracking opening of the valve assembly 10 when the pressure differential between the inlet and outlet is in a 25 to 85 psi range. Because the pressure surface 26 has a greater area, a greater fluid force is generated to overcome the spring force of the compression spring 31. Upon opening, the fluid or liquid passes through the fluid passageway 16 and out the outlet conduit 28. When the heat exchanger unit reaches its normal operating conditions, the pressure difference normally falls within a range of between 0 and 50 psi. When that occurs, the spring force of the compression spring 31 urges the poppet 17 to the right, as shown in FIG. 1, until the sealing ring 25 on the front end 22 of the poppet 17 engages the valve body 11 and closes the valve. In a heat exchanger operation, the valve assembly 10 is not only open during cold startup, but would open during operation as a result of high pressure spikes created, for example, by the operation of machinery attached to the overall fluid system.

While the valve assembly 10 is disclosed as a liquid valve for use as a by-pass valve in a heat exchanger system, the valve assembly 10 also has other uses for other fluids. One major advantage of the valve assembly 10 is that the compression spring 31 is specifically designed for its intended use and the plug 20 welded into position. Therefore, field adjustment of the unit is not possible, resulting in, essentially, a tamperproof unit.

Figure 4:
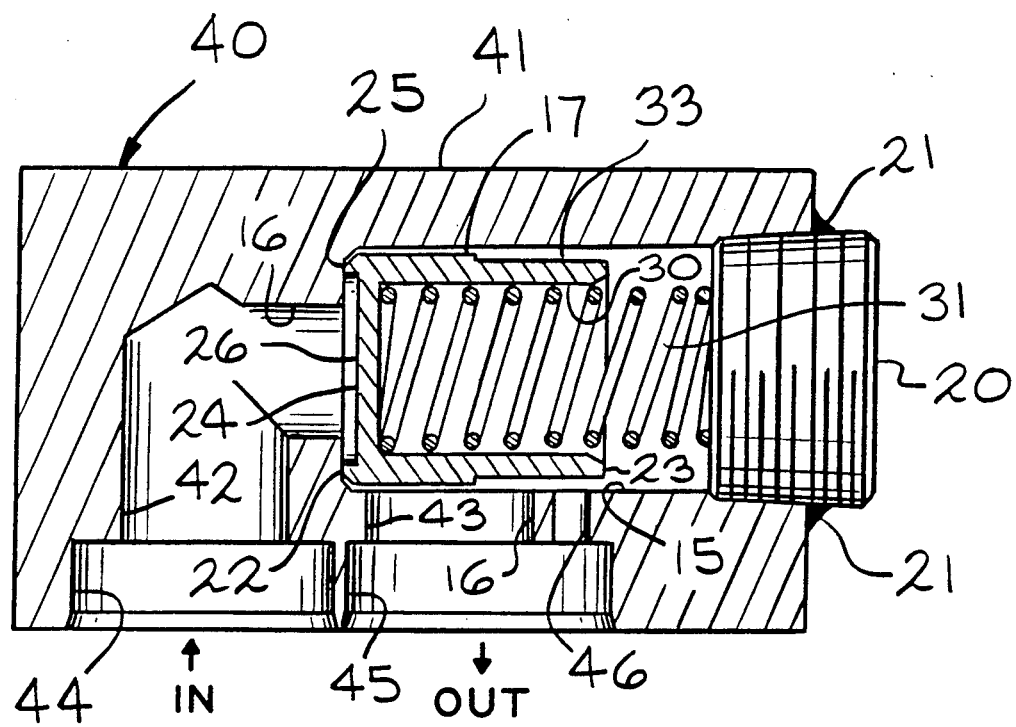
FIG. 4 is a cross-sectional view of another embodiment of a valve assembly, according to the present invention.
Figure 5:
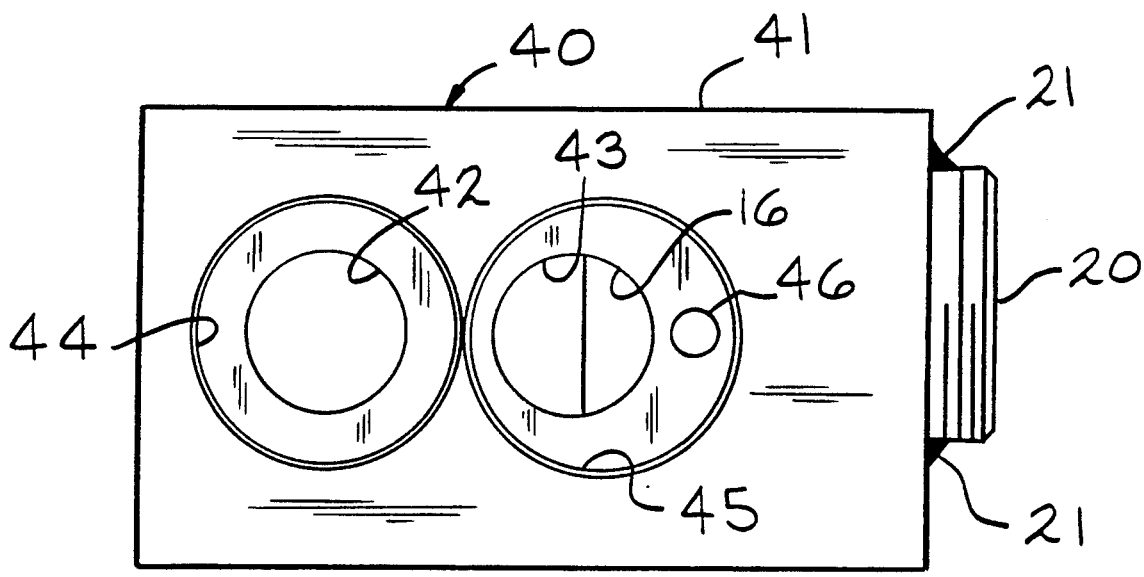
FIG. 5 is a bottom plan view of the embodiment shown in FIG. 4.

Referring to FIGS. 4 and 5, another embodiment of a valve assembly, according to the present invention, is generally indicated by the reference number 40. The valve assembly 40 includes a valve body 41 having an inlet opening 42 and a discharge opening 43. In this embodiment, the inlet and discharge openings 42 and 43 are located on the same side of the valve body 41. Connector recesses 44 and 45 are provided in the valve body 41 adjacent to the inlet opening 42 and the discharge opening 43, respectively. The recesses 44 and 45 serve as components of the inlet opening 42 and the discharge 43, respectively. A drain opening 46 is provided from the central cavity 15. The remaining components are essentially the same as those described in connection with the FIGS. 1 and 2 embodiment.

Figure 6:
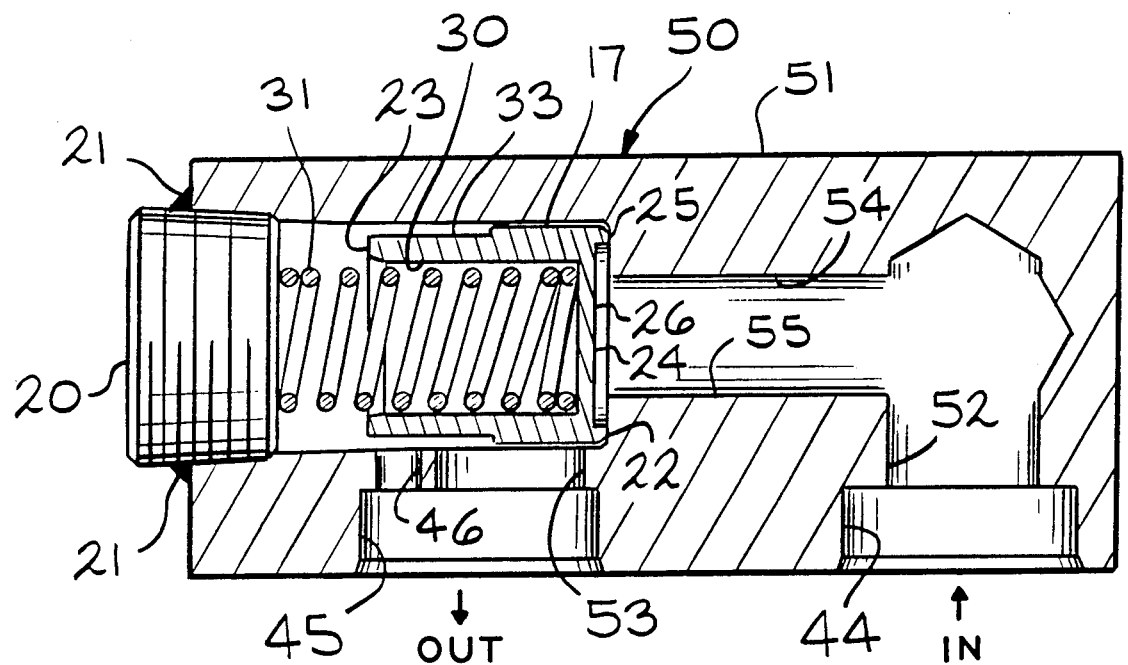
FIG. 6 is still another embodiment of a valve assembly, according to the present invention.
Figure 7:
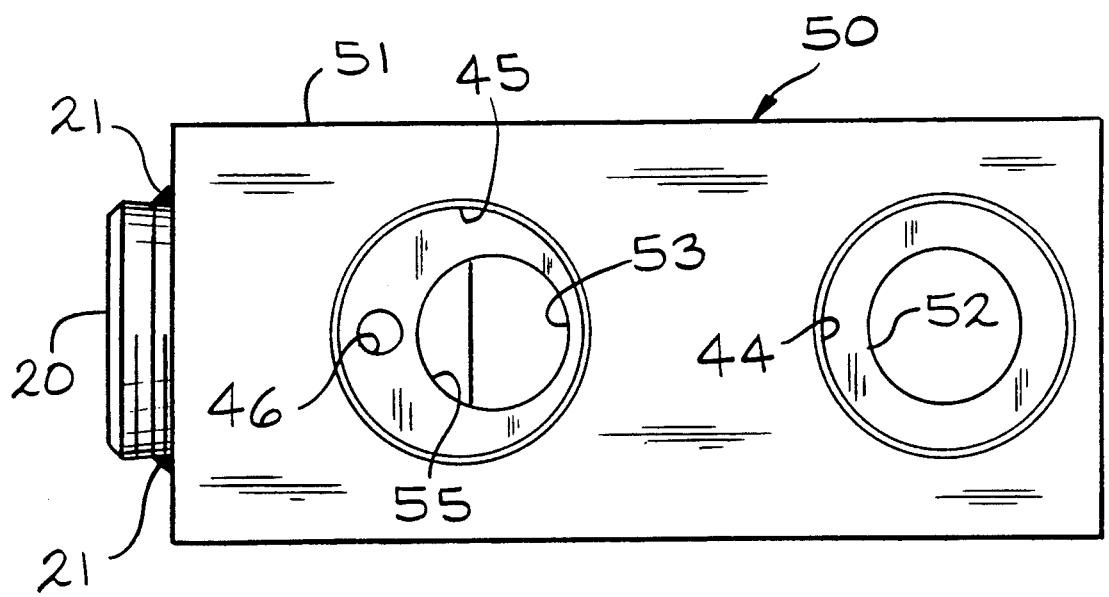
FIG. 7 is a bottom plan view of the embodiment shown in FIG. 6.

Referring to FIGS. 6 and 7, still another embodiment of a valve assembly, according to the present invention, is generally indicated by the reference number 50. The valve assembly 50 includes a valve body 51 having an inlet opening 52 and a discharge opening 53. In this embodiment, a longitudinally extending bore 54 is provided in the valve body 51 between the inlet 52 and the central cavity 15. The inlet 52, the bore 54, a portion of the central cavity 15 and the outlet 53 all serve as a portion of an overall fluid or liquid passageway 55. The remaining components of this invention are essentially the same as those shown in the previous embodiments.

Many changes or revisions may be made to the embodiments described above without departing from the scope of the following claims.

We claim:

1. A valve assembly comprising, in combination, a valve body having an inlet opening and a discharge opening, a liquid passageway extending between said inlet opening and said discharge opening, said body defining a central cavity in communication with said inlet opening and said discharge opening, a poppet having a front end and a rear end slideably mounted within said central cavity, said poppet being movable between an open position whereby liquid may pass through said valve and a closed position wherein the liquid flow through said valve is retarded, a fixed plug attached to said valve body for closing said central cavity, a compression spring extending between said fixed plug and said rear end of said poppet, said front end of said poppet defining a recess having a diameter greater than the diameter of said liquid passageway adjacent said inlet opening, and a drain opening defined by said valve body for draining fluid and pressure from said central cavity, said rear end of said poppet defining an exterior cylindrical recess, said cylindrical recess providing a liquid passage to said drain opening when said poppet is in either the open position or the closed position.

2. A valve assembly, according to claim 1, including a sealing ring surrounding said recess, said sealing ring engaging said valve body when said poppet is in such closed position and being spaced from said valve body when in such open position.

3. A valve assembly, according to claim 1, wherein a spring opening is defined in said rear end of said poppet.

4. A valve assembly, according to claim 2, wherein said compression spring has first and second ends, said first spring end being received by said spring opening in said poppet, said second spring end being positioned against said plug.

5. A valve assembly comprising, in combination, a valve body having an inlet opening and a discharge opening, a liquid passageway extending between said inlet opening and said discharge opening, said body defining a central cavity in communication with said inlet opening and said discharge opening, a poppet having a front end and a rear end slideably mounted within said central cavity, said poppet being movable between an open position whereby liquid may pass through said valve and a closed position wherein the liquid flow through said valve is retarded, a plug attached to said valve body for closing said central cavity, a compression spring extending between said plug and said rear end of said poppet, said front end of said poppet defining a recess having a diameter greater than the diameter of said liquid passageway adjacent said inlet opening, and a drain opening defined by said valve body for draining fluid and pressure from said central cavity, said rear end of said poppet defining an exterior cylindrical recess, said cylindrical recess providing a liquid passage to said drain opening when said poppet is in either the open position or the closed position.

* * * * *